United States Patent
Reid et al.

(10) Patent No.: US 10,334,837 B1
(45) Date of Patent: Jul. 2, 2019

(54) APPLICATOR FOR PESTICIDES WITH TRIGGER AND CARTRIDGE

(71) Applicant: Bayer CropScience, LP, Research Triangle Park, NC (US)

(72) Inventors: Byron Reid, Raleigh, NC (US); Peter Jardine, Wake Forest, NC (US); Steven Bockmann, Durham, NC (US); Michael Laut, Raleigh, NC (US)

(73) Assignee: Bayer CropScience LP, Research Triangle Park, NC (US)

(*) Notice: Subject to any disclaimer, the term of this patent is extended or adjusted under 35 U.S.C. 154(b) by 0 days.

(21) Appl. No.: 15/896,220

(22) Filed: Feb. 14, 2018

(51) Int. Cl.
| | | |
|---|---|---|
| *A01M 7/00* | (2006.01) | |
| *A01M 21/04* | (2006.01) | |
| *A01M 25/00* | (2006.01) | |
| *B65D 83/00* | (2006.01) | |

(52) U.S. Cl.
CPC ........ *A01M 7/0046* (2013.01); *A01M 21/043* (2013.01); *A01M 25/006* (2013.01); *B65D 83/0005* (2013.01); *B65D 83/0083* (2013.01)

(58) Field of Classification Search
CPC .. A01M 7/0046; A01M 25/006; A01M 21/00; B65D 83/0038; B65D 83/0005; B65D 84/0044

See application file for complete search history.

(56) References Cited

U.S. PATENT DOCUMENTS

| | | | | |
|---|---|---|---|---|
| 3,225,760 A | * | 12/1965 | Di Cosola | A61B 17/68 156/94 |
| 3,254,806 A | * | 6/1966 | Madsen | B05C 17/015 222/333 |
| 3,353,537 A | * | 11/1967 | Knox | A61M 5/204 222/334 |
| 3,780,830 A | * | 12/1973 | Helgerud | F16N 3/12 184/105.2 |
| 3,980,209 A | * | 9/1976 | Collar | B05C 17/015 222/323 |
| 4,915,304 A | * | 4/1990 | Campani | A01M 7/0046 239/428.5 |
| 5,482,187 A | * | 1/1996 | Poulsen | B05B 11/0054 222/207 |
| 5,531,384 A | * | 7/1996 | Greene | B05B 5/053 239/323 |
| D403,933 S | | 1/1999 | Strong | |
| D404,484 S | | 1/1999 | Lahr et al. | |
| 5,931,347 A | * | 8/1999 | Haubrich | B05B 11/0037 222/129 |
| D419,641 S | | 1/2000 | Wilson | |

(Continued)

FOREIGN PATENT DOCUMENTS

| | | | | |
|---|---|---|---|---|
| DE | 202016102544 U1 | * | 7/2016 | ............ B65D 83/00 |
| FR | 3007621 B1 | * | 2/2016 | .......... A01M 7/0046 |

(Continued)

*Primary Examiner* — Magdalena Topolski

(74) *Attorney, Agent, or Firm* — Bayer CropScience LP

(57) ABSTRACT

An applicator assembly for gel-based product and method of use that includes a housing enclosing a pump with a handle extending from the housing. The handle holds a flush mounted trigger assembly that operates the pump. Product is drawn from an external cartridge by vacuum. A movable plug maintains product structural integrity as product is withdrawn from the cartridge.

21 Claims, 6 Drawing Sheets

(56) References Cited

U.S. PATENT DOCUMENTS

| | | | |
|---|---|---|---|
| 6,029,862 A * | 2/2000 | Jones | B65D 83/202 222/402.11 |
| D436,007 S | 1/2001 | Morford | |
| 6,364,170 B1 * | 4/2002 | Anderson | B05B 11/0016 222/131 |
| D459,786 S | 7/2002 | Sweeton | |
| 6,467,579 B1 * | 10/2002 | Simon | F16N 3/12 184/105.2 |
| D474,528 S | 5/2003 | Huang | |
| D499,167 S | 11/2004 | Sweeton | |
| D505,481 S | 5/2005 | Harper et al. | |
| 6,938,795 B2 | 9/2005 | Barton et al. | |
| D511,861 S | 11/2005 | Fernandez | |
| D514,406 S | 2/2006 | Lee | |
| D516,672 S | 3/2006 | Khubani et al. | |
| D520,308 S | 5/2006 | Burgess | |
| D526,709 S | 8/2006 | Engelen | |
| 7,165,357 B2 * | 1/2007 | Burgess | A01G 7/06 47/48.5 |
| D541,121 S | 4/2007 | Axinte et al. | |
| 7,451,900 B2 | 11/2008 | Hornsby et al. | |
| D603,501 S | 11/2009 | Mudd et al. | |
| D608,856 S | 1/2010 | Dammkoehler | |
| 7,677,418 B2 * | 3/2010 | Henniges | A61B 17/8822 222/327 |
| D660,663 S | 5/2012 | Brummitt | |
| D673,020 S | 12/2012 | Brummitt | |
| D692,532 S | 10/2013 | Li et al. | |
| 8,870,093 B2 * | 10/2014 | Brummitt | B05B 7/045 222/105 |
| D768,848 S | 10/2016 | Cooper et al. | |
| 9,623,427 B2 | 4/2017 | Gilpatrick et al. | |
| 9,686,976 B2 | 6/2017 | Ramsdell et al. | |
| 9,775,697 B2 * | 10/2017 | Buckley | A61D 7/00 |
| 2002/0179075 A1 * | 12/2002 | Robinson, Jr. | A01M 1/2016 124/56 |
| 2003/0053846 A1 * | 3/2003 | Kopanic | A01M 7/00 401/138 |
| 2006/0000854 A1 * | 1/2006 | Hornsby | B05B 1/34 222/464.5 |
| 2006/0043120 A1 * | 3/2006 | Campbell | B05C 17/0146 222/386.5 |
| 2006/0231568 A1 * | 10/2006 | Lynn | A47K 5/1202 222/52 |
| 2010/0001017 A1 * | 1/2010 | Herman | B05C 17/0103 222/1 |
| 2013/0020350 A1 | 1/2013 | Gardos et al. | |
| 2016/0255826 A1 * | 9/2016 | Ramsdell | A01M 21/00 |
| 2016/0279652 A1 * | 9/2016 | States, III | B05B 7/2418 |

FOREIGN PATENT DOCUMENTS

| KR | 1020040004851 A | 1/2004 |
|---|---|---|
| KR | 200442262 Y1 | 10/2008 |

* cited by examiner

APPLICATOR FOR PESTICIDES WITH TRIGGER AND CARTRIDGE

FIELD OF THE INVENTION

The invention relates generally to the structure and use of applicators for substances, such as pesticides, more particularly to applicators using external cartridges and still more particularly to applicators having trigger activated pumps.

BACKGROUND

Pesticides, insecticides, fungicides, and other chemical are often applied to specific smaller targets as well as large fields. In the former situation, hand-held applicators can be used to bring the product close to the target and apply a quantity of chemical product to the target. Products in the form of a gel may be applied in this way using cartridges containing the product that are attached to the applicators.

Prior applicators often have disadvantages such as not being designed to avoid under- or over-application of pesticide, not delivering a controlled amount of substance, and/or difficulty in applying the correct amount of substance, resulting in product waste, increased product cost, or over use.

Mechanical pumping mechanisms are complex and expensive. They are prone to failure, or require specialized mechanical expertise to service, maintain or to repair them. This complicates both business operations for the user and risks pest management effectiveness in the event of failure during the application.

One such applicator is seen in U.S. Patent Publication 2013/0020350 to Gardos, et al. ("Gardos"). Gardos discloses an applicator using a powered motor to operate a push rod to push product out of the cartridge. The cartridge is mounted on the front side of the applicator. A trigger turns on the pump which pushes the rod into the product cartridge thus pushing out the product. Gardos does not allow for a measured application of a product because the product is emitted from the applicator as long as the trigger is held. In addition, the cartridge is held by a complex holding mechanism that must be disassembled and reassembled when an empty cartridge is replaced. Additionally, because the push rod is motorized, the applicator is likely to be expensive to assemble and purchase.

U.S. Pat. No. 7,451,900 to Hornsby, et al. ("Hornsby") discloses an electrically powered pump delivery system in which a gear pump is used to eject liquid substances, e.g. insecticide or cleaner, onto a target. The gear pump and electric power source, such as a battery, are enclosed within a gun shaped housing. Similar to Gardos, Hornsby does not provide for the delivery of a consistent quantity of liquid onto a target as the trigger may be held and the pump operated for varying lengths of time. Thus, the Hornsby delivery system is not particularly useful when a consistent quantity of product is required to be delivered onto a target. In addition, the electrical power system and the complex gear pump tend to make manufacture and assembly of the disclosed delivery system comparatively more expensive than similar devices that are purely mechanically driven.

U.S. Pat. No. 9,623,427 to Gilpatrick, et al. ("Gilpatrick") discloses a chemical injector for a spray device. The device is attached to a water hose and includes a container for the chemical to be injected. The trigger controls the delivery of water which mixes with the chemical and ejects a combined water-chemical solution. This device has the disadvantage of being tied to the water hose and also requires both manipulation of the trigger for the water and a separate control for the chemical container.

U.S. Pat. No. 6,938,795 to Barton, et al. ("Barton") discloses a fluid delivery system. The Barton device is gun-shaped but lacks a typical trigger. It is activated by pressing two recessed plates that activate a circuit to power the system. The device is connected to an electric line that is connected to a control system. Like, the Gilpatrick device, the Barton device is limited in range as it is connected to an electric line that is ultimately connected to a work station. Similar to Gardos and Hornsby, Barton does not provide for the delivery of a consistent quantity of liquid onto a target as the recessed plates may be held and the pump operated for varying lengths of time. Thus, the Barton delivery system is not particularly useful when a consistent quantity of product must be delivered onto a target.

U.S. Pat. No. 9,686,976 to Ramsdell, et al. ("Ramsdell") depicts an airless, variable metered applicator that delivers a substance using a syringe container with a gun shaped applicator. While this device possesses improvements in the field, further advances and improvements are desired in the field.

Therefore, there continues to be a need for an applicator-cartridge assembly that enables application of a specific amount of product, is inexpensive to assemble, and allows for the accurate delivery of a particular amount of substance to a particular target.

SUMMARY OF THE INVENTION

Various embodiments of the present invention are directed to an applicator for pesticides having a trigger and a cartridge. In one embodiment, an applicator assembly for a gel product includes: a housing having a first end and a second end; a pump enclosed by the housing; a handle extending from the housing; a cartridge receiving orifice proximate the first end of the housing; an outlet formed at the second end of the housing; a trigger assembly housed in the handle and operatively attached to the pump. In one embodiment, the applicator assembly includes an aiming light which may be an LED. A cartridge having a distal end and a proximal end containing the gel-based product is releasably attached to the first end of the applicator.

Also disclosed is a method of using the applicator including: inserting a cartridge into the cartridge receiving port of the housing; pulling the trigger of the trigger assembly to actuate the pump; drawing the product from the cartridge; and, pumping the product through the outlet. The cartridge may be prefilled with a product which can be a gel or liquid.

Additionally disclosed is a method of applying a product onto a target including: releasably attaching the cartridge onto the applicator; pointing the outlet of the applicator toward a target; pulling the trigger of the trigger assembly of the applicator; and, pumping the product through the outlet of the applicator onto the target. The cartridge is prefilled with the product. The product may be an insecticide, pesticide, fungicide, herbicide, or any combination thereof. The target may be a specific location or may be an undesired organism such as weeds, insects, fungi, spiders and other living plants or animals.

These and other details, objects, and advantages of the present invention will become better understood or apparent from the following description and drawings showing embodiment thereof.

BRIEF DESCRIPTION OF THE DRAWINGS

Embodiments will hereinafter be described with reference to the accompanying drawings, which have not necessarily been drawn to scale. Where applicable, some features may not be illustrated to assist in the illustration and description of underlying features. Throughout the figures like reference numerals denote like elements.

DETAILED DESCRIPTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to certain embodiments, it is understood that the invention is not limited to the disclosed embodiments. The present invention is intended to cover various modifications and equivalent arrangements included with the spirit and scope of the appended claims.

Furthermore, it is understood that this invention is not limited to the methodology, materials, and modifications described and as such, may vary. It is also understood that the terminology used herein is for the purpose of describing particular aspects only, and in not intended to limit the scope of present disclosure, which is defined only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", approximately", "around", "bordering on", closer to", essentially", "in the neighborhood of", "in the vicinity", etc. and such terms may be used interchangeable as appearing in the specification and claims. It should be appreciated that the term proximate" is synonymous with terms such as "nearby", "close", "adjacent", neighboring", immediate", adjoining", etc. and such terms may be used interchangeably as appearing in the specification and claims. Although any methods, devices, or materials similar or equivalent to those described herein can be used in the practice or testing of the embodiments of the disclosure, the representative methods, devices, and materials are now described.

Figure 1:
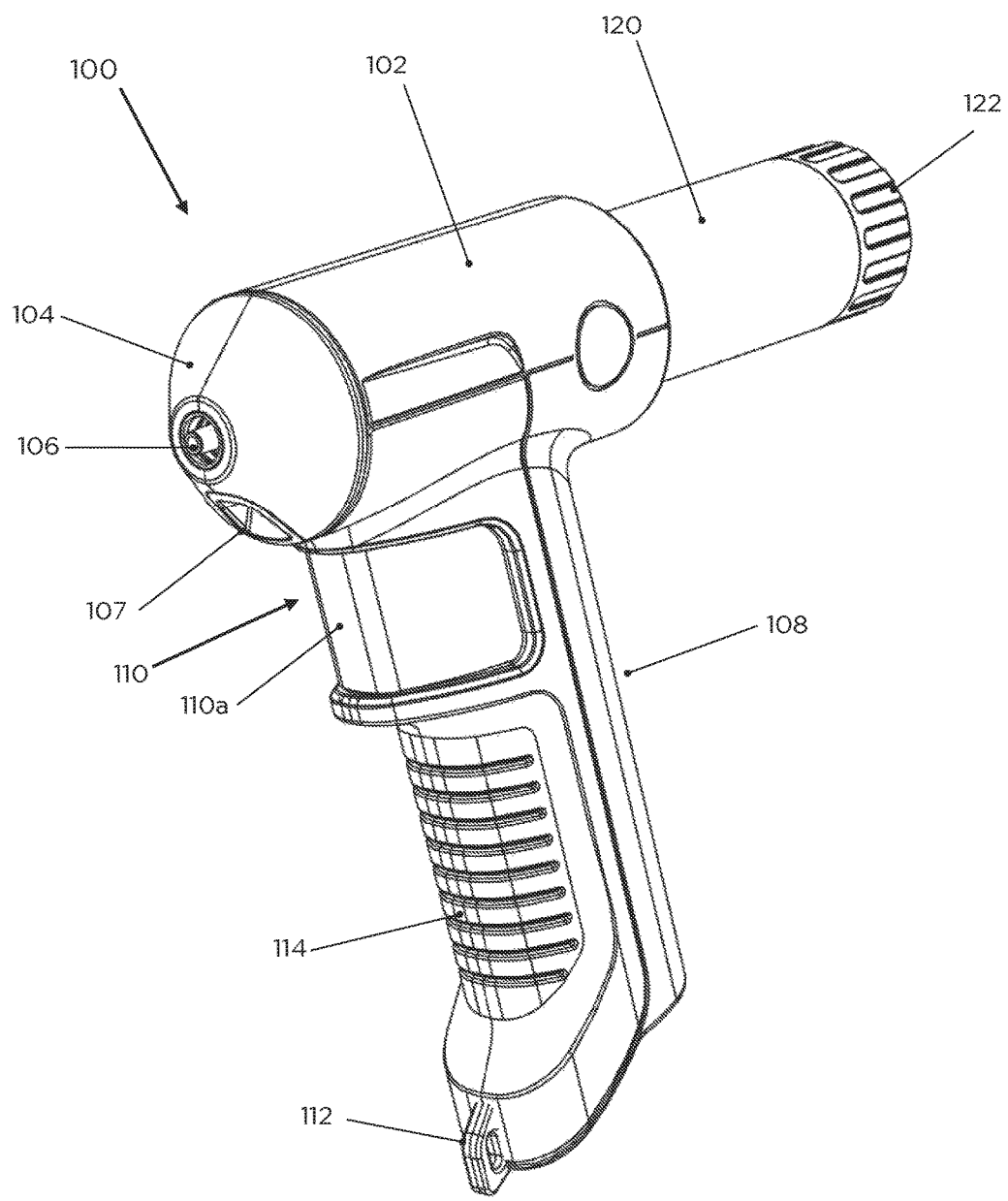
FIG. 1 is a front perspective view of an applicator of the present invention.

Adverting to the drawings, FIG. 1 is a front perspective view of applicator 100 of the present disclosure. Housing 102 encloses a pump mechanism (not seen in FIG. 1). Housing 102 tapers toward the front of applicator 100 to form head 104. Head 104 may be integral with housing 102 or may be a separate component attached to housing 102. By integral is meant that the components are formed together as a single unit. At the tip or end of head 104 is pump outlet 106. In one embodiment, tip 106 may be either a male or female luer lock. In one embodiment, LED aiming light 107 may be positioned proximate, generally under, tip 106 to aid in aiming applicator 100 in dark situations.

Handle 108 extends from housing 102 and may be integral with it as seen in FIG. 1. Trigger assembly 110 is mounted in handle 108. In the embodiment shown, trigger 110a of trigger assembly 110 is flush-mounted in handle 108 which gives the advantage of not protruding from applicator 100 to possibly catch on objects while applicator 100 is in use. Attachment loop 112 is at the end of handle 110 and can be used to attach applicator 100 to a belt or hook. Cartridge 120 with end 122 is shown extending rearward from applicator 100. Handgrip 114 is seen below trigger 110.

Figure 2:
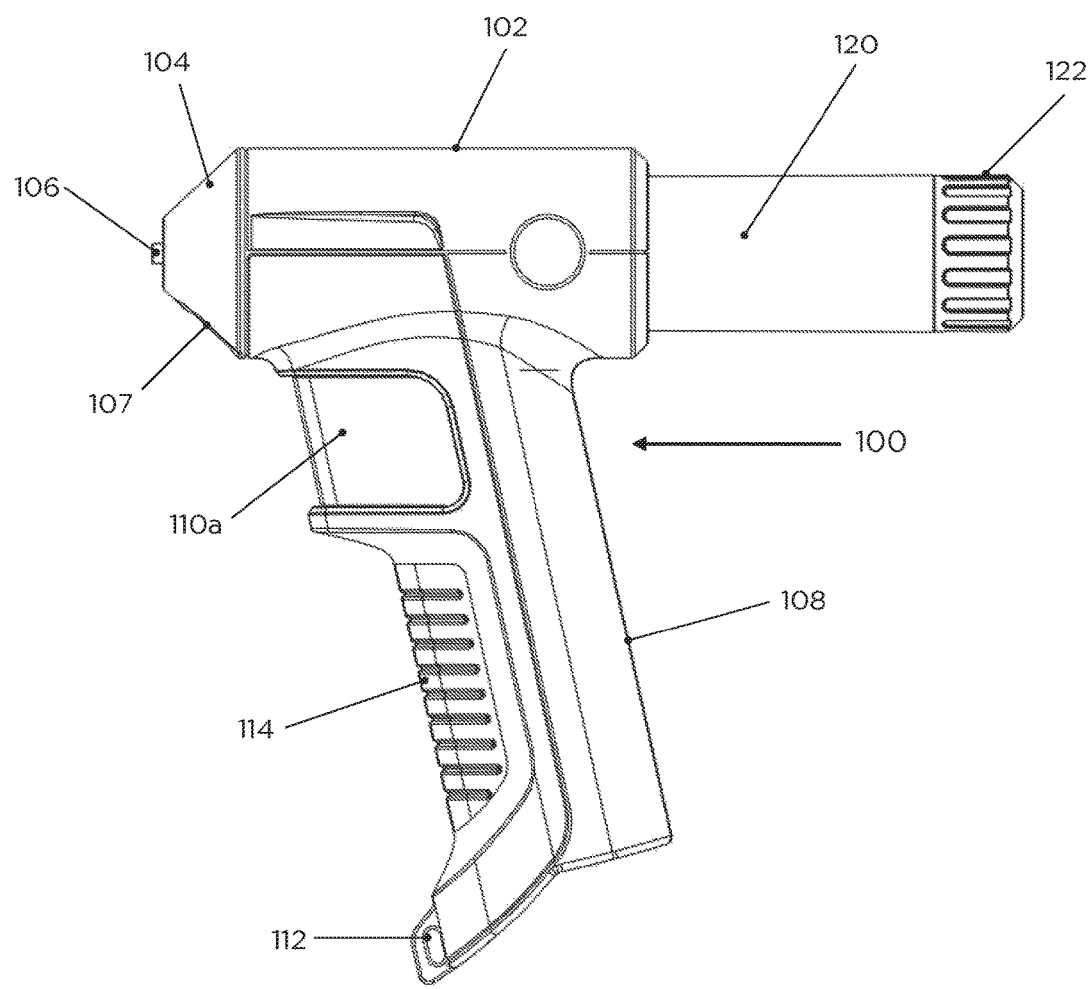
FIG. 2 is a side view of an applicator of the present invention.

FIG. 2 is a side view of applicator 100. Cartridge 120 is more clearly seen to be inserted into the rear of housing 102. In addition, it can be seen that the front edge of trigger 110a does not extend beyond, and is close to, the front edge of handle 108 thereby demonstrating the flush-mount of trigger 110a within handle 108.

Figure 3:
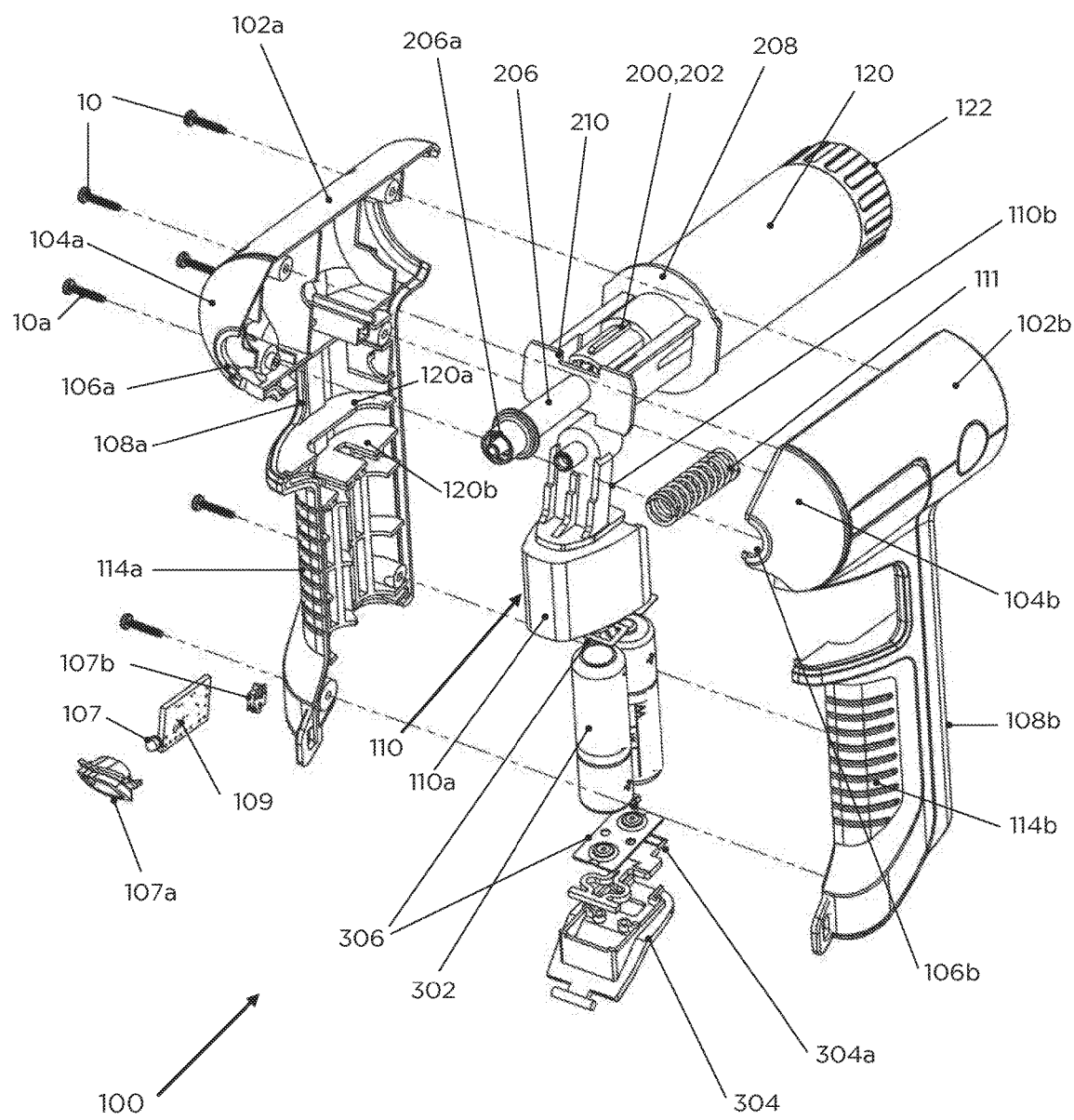
FIG. 3 is an exploded diagram of an embodiment of the applicator of the present invention.

FIG. 3 is an exploded front perspective view of applicator 100. Housing 102 is seen divided into two halves 102a and 102b. Similarly, handle 108 is separated into two halves 108a and 108b, each extending from housing halves 102a and 102b, respectively. Head 104, tip 106, and handgrip 114 are all divided as head halves 104a and 104b, tip halves 106a and 106b, and handgrip halves 114a and 114b, respectively. Trigger release spring 111 is also shown. Screws 10 hold housing halves 102a and 102b together. Housing 102 may also comprise two clamshell halves held together by a hinge at the top surfaces of each half.

Pump housing 202 of pump 200 is shown and is enclosed by housing 102. Pump outlet 206a may include a luer lock and extends from pump outlet channel 206 through tip 106. Backing plate 208 forms a backstop preventing cartridge 120 from being inserted too far into pump 200, while front plate 210 forms a contact for head 104.

FIG. 3 also depicts trigger assembly 110 showing trigger 110a attached to pump actuator 110b. Pump actuator 110b contacts pump plunger 203. In one embodiment, pump actuator 110b may be attached to pump plunger 203. The action of trigger assembly 110 is explained below. Trigger assembly 110 is enclosed within housing 102 between ribs 120a and 120b.

Optional LED 107 is seen under pump housing 200 soldered or otherwise attached to LED PCB (printed circuit board) 109. Also seen are LED bezel 107a and LED switch 107b. FIG. 3 also shows batteries 302, battery door 304 with door catch/spring 304a, and contacts 306. It will be understood that in an alternate embodiment, LED 107 and/or batteries 302 may not be present.

Figure 4:
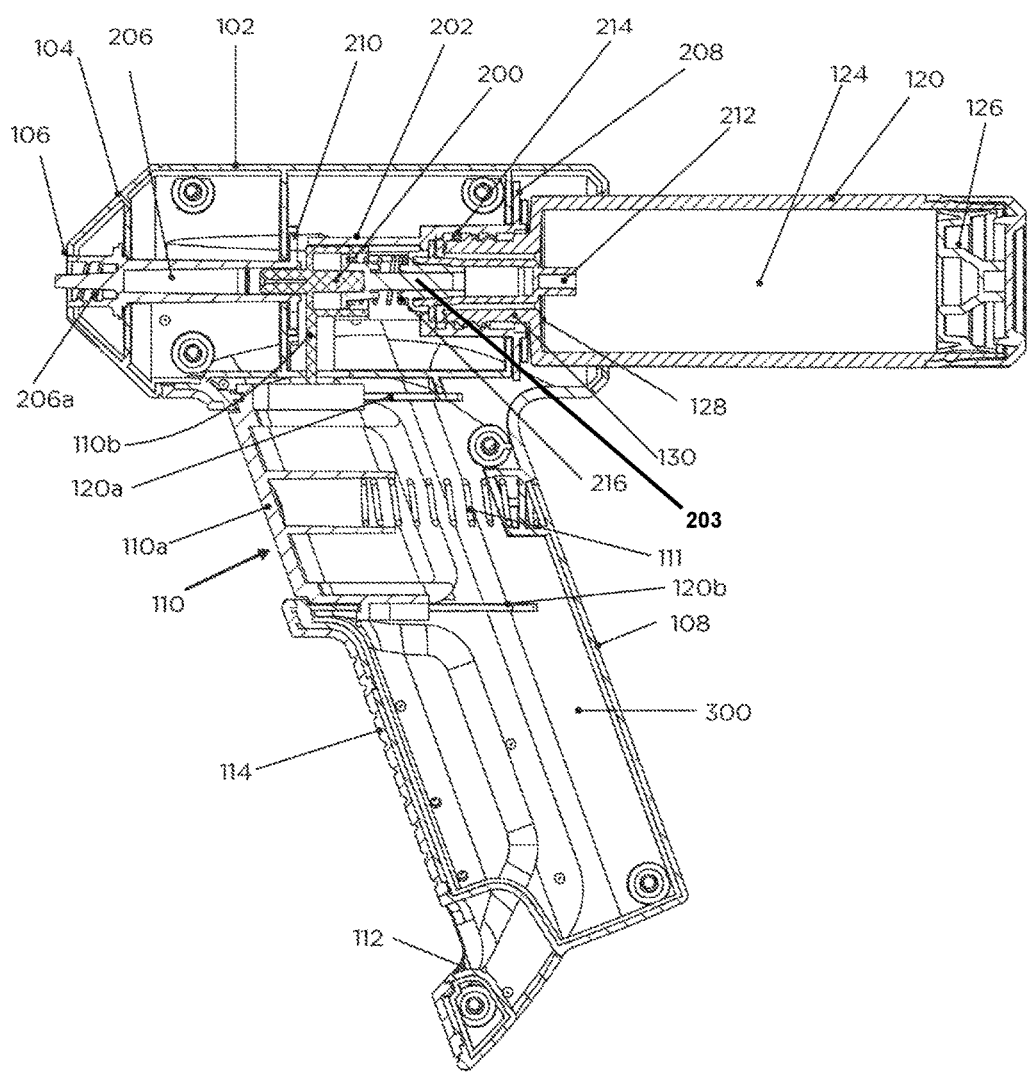
FIG. 4 is a cross section of an applicator of the present invention depicting the components of applicator pump and its components.

FIG. 4 is a cross section of applicator 100 depicting the pump 200 and its components. Pump 200 can be manufactured according to Korean Patent Publications Nos. 10-2004-0004851 and 2004-42262 which are hereby incorporated by reference in their entirety. Cartridge 120 is seen inserted into receiving port 214 which is threadably attached to cartridge outlet 130. Cartridge 120 is inserted up to back plate 208 to prevent it from being placed too far into receiving port 214. It will be recognized that other releasable connections may be used to attach cartridge 120 with receiving port 214. For example, attachment may be effected with a friction fit or by a spring type lock well known in the art. Piston 126 is seen at the distal end 122 of cartridge 120.

Trigger assembly 100 is operatively attached to pump 200. By operatively attached or connected is meant that a component or device is connected either directly or indirectly to a second component and causes that second component to function. In this instance, trigger 110a is operatively attached to pump 200 through pump actuator 110b meaning that when trigger 110a is pulled back toward the rear surface of handle 108, pump actuator 110b, which contacts or is attached to trigger 110a, pushes pump plunger 203 of pump 200 back toward cartridge 120 causing pump 200 to draw the gel-like product to be pumped from cartridge 120 through pump plunger 203 and out tip 106.

When pushed back by pump actuator 110b, pump plunger 203 pushes product already in the chamber into outlet channel 206 and subsequently out tip 106. Pump plunger 203 is returned to its resting position seen in FIG. 4 by the expansion of pump return spring 216 which was compressed by the movement of pump plunger 203. Trigger assembly 110 is returned by expansion of trigger return spring 111. Alternatively, trigger assembly 110 can be directly attached to pump plunger 203 to form the operative attachment. In each pump cycle, pump plunger 203 is moved from its resting position the same distance toward cartridge 120 ensuring the same quantity of product is drawn from cartridge 120. Persons of skill in the art will be recognized that applicator 100 can be designed to include longer or shorter pump plunger pathways to draw larger or smaller amounts of product form cartridge 120.

Figure 4A:
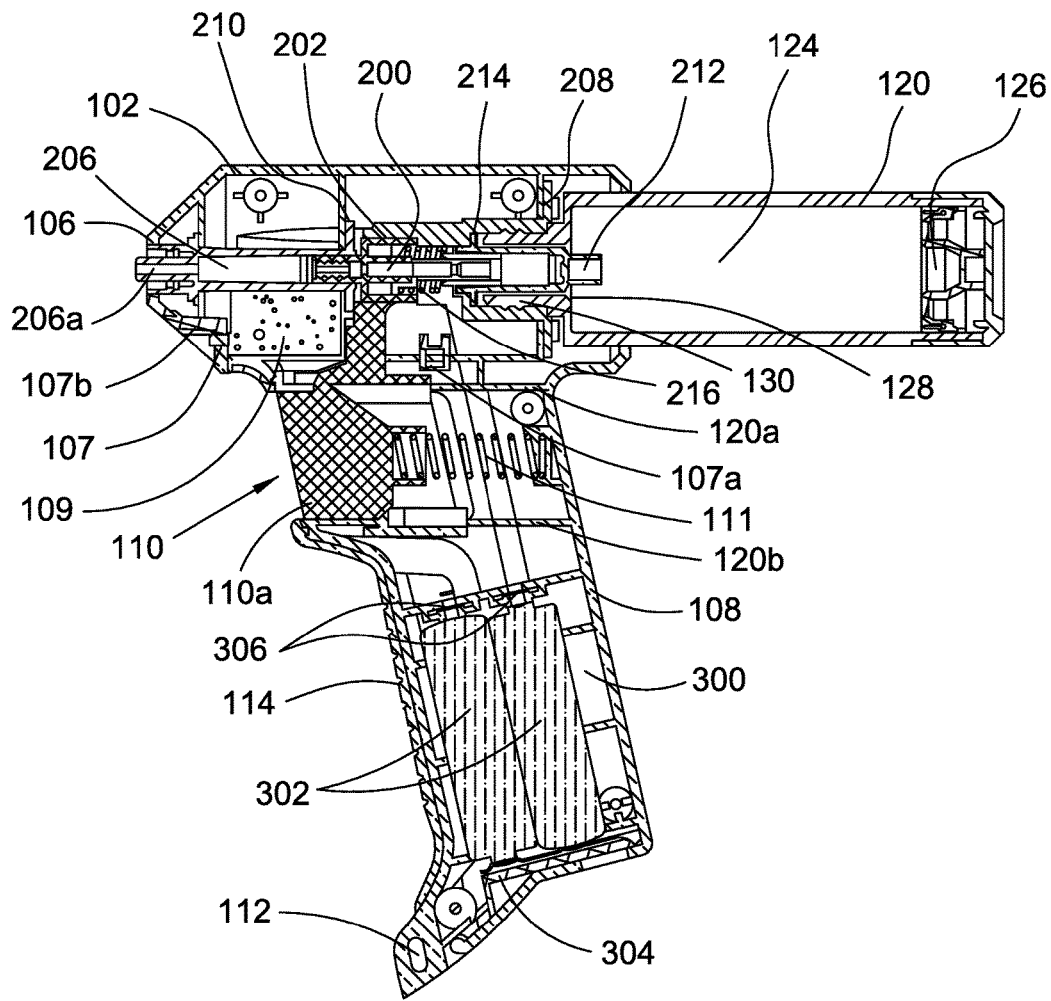
FIG. 4A is a cross section view of the alternate embodiment of applicator seen in FIG. 4 to include an LED aiming light; and, FIG. 5 is a partial cross section of the cartridge with a movable piston.

FIG. 4A is a cross section view of the alternate embodiment of applicator 100 to include LED 107. In this view, pump actuator 110b is not displayed to show more clearly LED 107 and accompanying components. LED 107 and PCB 109 are shown beneath pump outlet channel 206b. LED switch 107b is shown in the pathway of trigger assembly 110 and may be turned on to activate LED 107 when it is pulled back. Optionally, switch 107a may be activated separately from trigger assembly 110. LED 107 acts as an aiming device to assist the user in applying the product on the desired target.

Batteries 302, battery door 304 and catch spring 304a are depicted. Area 300 of handle 108 can be a window displaying information such as, but not limited to quantity remaining in cartridge 120, number of applications applied to targets, and battery life with the display controlled by one or more battery powered integrated circuits. A person having skill in the art will recognize that the window may be placed on other parts of applicator 100 such as the top of housing 102.

Electronic components known in the art (not shown) may be used to collect data regarding amount of product drawn from cartridge 120, the number of pump cycles, the quantity ejected from applicator 100, type of product being pumped and whether it is authorized (using suitable RFIDs or Bluetooth connections on cartridge 120 and applicator 100), total usage hours, time/date of operation (using a clock/calendar application) and similar data. It will be recognized that electronic components 300 may be located elsewhere in handle 108 or in suitable locations in housing 200.

Figure 5:
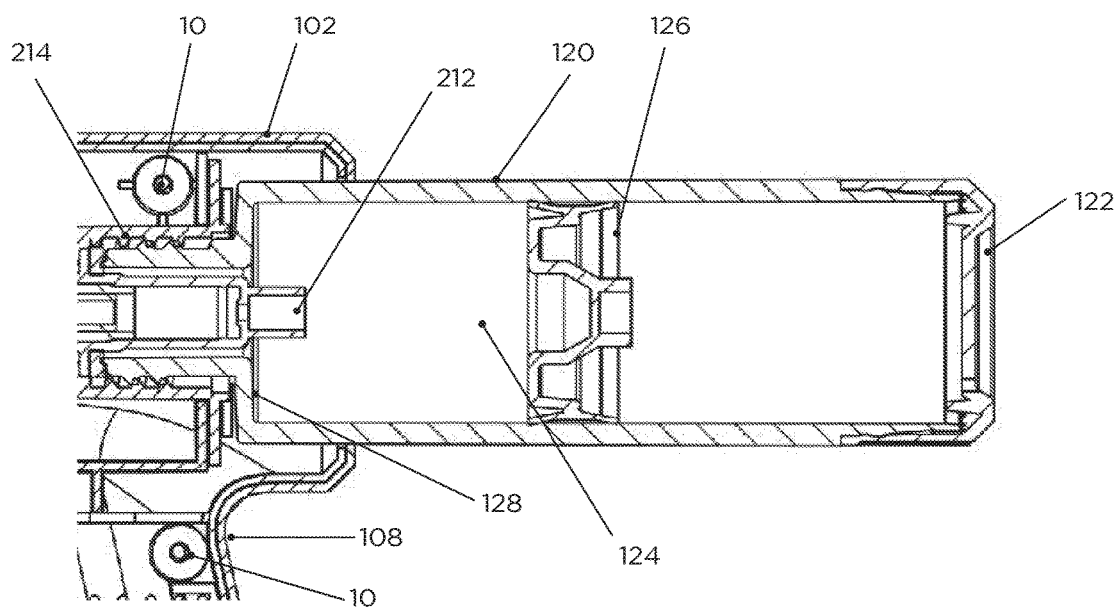

FIG. 5 is a partial cross section of cartridge 120 and the connection to receiving port 214. When pump 200 returns to its resting position, the movement creates a vacuum that draws the product into pump 200 through pump inlet 212. Because there is no air flow into cartridge 120, a vacuum is created in chamber 124 of cartridge 120. Chamber 124 is the volume of cartridge 120 between movable piston 120 and inlet 212. When the vacuum is created, the desired effect is to have the vacuum filled by drawing product from cartridge chamber 124 into inlet 212. However, as product is removed it will collapse in the chamber, i.e., it will fall away from the walls of chamber 124 and away from inlet 212 preventing product from reaching pump 200. FIG. 5 shows movable piston 126 in the middle of cartridge 120. This movement of piston 126 is created by outside air entering cartridge 120 through a vent in cap 122 fixedly attached to the distal end of cartridge 120 into the cartridge 120 behind piston 126, thereby pushing movable piston 126 toward inlet 212. Movable piston 126 forms a seal with the inner walls of cartridge 120 preventing air from entering chamber 124 in front of piston 126. This has the effect of making chamber 124 smaller and maintaining the structural integrity of the product. By structural integrity is meant that the product will still fill chamber 124 to the inner wall as it is drawn into outlet 212. In other words, the reduction in product quantity is matched by the shrinking volume of chamber 124. Another benefit of maintaining structural integrity to check the collapse of the volume inside cartridge 24 is the prevention of the formation of air pockets into the system. The presence of air pockets may cause the pump to lose prime and/or disrupt the accuracy of uniform product application. It will be recognized that innumerable products may be applied from applicator assembly 100 such as insecticides, fungicides, and pesticides, as well as other products such as glues. Preferably, the products are gel-based products.

The use of an external cartridge with applicator 100 has advantages in that it is easy to replace an empty cartridge with a full one. A distinct advantage of this easily interchanged cartridge is that the applicator can readily be switched between products, either between different types of applications or within the type of application. The ability to easily switch products is a feature of importance in integrated resistance management programs. Other advantages include that applicator 100 is easier to use than other applicators in the field, as it is not tethered to a power or product line, and a known quantity of product is ejected with each pump cycle, which reduces overuse of the product. Applicator 100 can be easily manufactured with different pump travel distances resulting in different embodiments delivering different quantities of product while operating with the same mechanism. Different products may be used with the same applicator 100 including using a cartridge filled with a neutral cleaning solution to clean pump 200 and its component parts. By using cartridge 120 with a movable piston 126 moving toward inlet 212, cartridge 120 may be removed with a cap placed over cartridge outlet 130 with the integrity of the gel-like product maintained by the smaller chamber created by the movement of movable piston 126. The structure of applicator 100 also enables a specific quantity of product to be ejected as pump 200 moves a specific distance and therefore draws a specific quantity of product from cartridge 120 on each pump cycle.

Applicator 100 can be used to apply the product contained in cartridge 120 to a target by inserting cartridge 120 into cartridge receiving port 214 housing and then pulling trigger assembly 110 to actuate pump 200. Activation of pump 200 will draw the product from cartridge 120 and pumping the product through outlet channel 206. In one embodiment, applicator 100 will include LED 107 which can be used to more easily aim applicator 100 toward a target. The gel product may be an insecticide, a pesticide, a fungicide, a weed killer, or any combination thereof. Possible targets include, but are not limited to, insects, worms, weeds, fungi, spiders, or any combination of these and other suitable targets.

Products that may be used in applicator 100 include, but are not limited to, gel bait formulations used in control of cockroaches, ants, flies and other insect pests. However, applicator 100 is designed so any and all gel formulations can be used. Cartridges 120 may range in size from about 30 to about 36 gm (30 to 35 cc) cartridges, however larger cartridges 120 containing more product may be used, as cartridges 120 can be lengthened and/or widened to contain more product.

Thus, it is seen that the objects of the invention are efficiently obtained, although changes and modifications to the invention should be readily apparent to those having ordinary skill in the art, which changes would not depart from the spirit and scope of the invention as claimed.

What is claimed:

1. An applicator comprising
a housing having a first end and a second end disposed along a longitudinal axis of the housing;
a pump enclosed by said housing;
a handle extending from said housing;
a cartridge having a distal end and a proximal end, wherein the cartridge comprises a product in the form of a liquid or gel;
a cartridge receiving port proximate said first end of said housing;
   wherein the proximal end of said cartridge is releasably attached to said cartridge receiving port along the longitudinal axis of the housing;
an outlet formed at said second end of said housing; and,
a trigger assembly housed in said handle and operatively attached to said pump,
   wherein said trigger assembly moves said pump toward said cartridge receiving port further comprising a movable piston proximate said distal end of said cartridge, said movable piston arranged within a cavity within said cartridge, and a cap including an air vent fixedly attached to said distal end of said cartridge; wherein said movable piston pushes said liquid or gel product within said cartridge toward said cartridge receiving port when said liquid or gel product is pumped from said cartridge.

2. The applicator according to claim 1, wherein said pump includes a pump plunger and said trigger assembly is operatively attached to said pump plunger.

3. The applicator according to claim 2, wherein said trigger assembly includes a trigger and a pump actuator attached to said trigger, wherein said pump actuator forms said operative attachment with said pump plunger.

4. The applicator according to claim 1, further comprising an LED aiming light proximate to said second end of said housing.

5. The applicator according to claim 1, wherein said releasable attachment is a threadable attachment.

6. The applicator according claim 1, wherein said releasable attachment is a spring-loaded attachment formed to receive said proximal end of said cartridge.

7. The applicator according to claim 1, wherein said trigger is flush-mounted into said handle.

8. The applicator according to claim 1, wherein said housing comprises two half sections fixedly attached together.

9. The applicator according to claim 1, wherein said housing includes two halves attached in a clamshell manner.

10. The applicator according to claim 1, wherein said product is a gel bait formulation used in control of cockroaches, ants, flies or other insect pests.

11. The applicator according to claim 1, further comprising a battery powered integrated circuit enabling a display of operational information of the applicator.

12. The applicator according to claim 11, wherein the operational information includes one or more of battery life, quantity of product in the cartridge, and number of pump cycles.

13. The applicator according to claim 11, further comprising an RFID connection between the cartridge and the integrated circuit, wherein said RFID connection provides at least one of operational information regarding type of product and quantity of product in the cartridge.

14. The applicator according to claim 11, further comprising a Bluetooth connection between the cartridge and the integrated circuit wherein said Bluetooth connection provides at least one of information regarding type of product and quantity of product in the cartridge.

15. A method of using an applicator,
   wherein the applicator comprises
      a housing having a first end and a second end disposed along a longitudinal axis of the housing;
      a pump enclosed by said housing;
      a handle extending from said housing;
      a cartridge having a distal end and a proximal end, wherein the cartridge is prefilled with a product which is a liquid or gel;
      a cartridge receiving port proximate said first end of said housing;
         wherein the proximal end of said cartridge is releasably attached to said cartridge receiving port along the longitudinal axis of the housing;
      an outlet formed at said second end of said housing; and,
      a trigger assembly housed in said handle and operatively attached to said pump,
         wherein said trigger assembly moves said pump toward said cartridge receiving port, further comprising a movable piston proximate said distal end of said cartridge, said movable piston arranged within a cavity within said cartridge, and a cap including an air vent fixedly attached to said distal end of said cartridge; wherein said movable piston pushes said liquid or gel product within said cartridge toward said cartridge receiving port when said liquid or gel product is pumped from said cartridge
   the method comprising
   inserting the cartridge into the cartridge receiving port of the housing;
      pulling a trigger of said trigger assembly to actuate said pump;
      drawing said product from said cartridge; and,
      pumping said product through said outlet.

16. The method of claim 15, further comprising aiming an LED light toward a target.

17. The method of claim 15, wherein the product is selected from the group consisting of insecticide, pesticide, fungicide, herbicide, and a combination thereof.

18. A method of applying a product onto a target using an applicator,
   wherein the applicator comprises
      a housing having a first end and a second end disposed along a longitudinal axis of the housing;
      a pump enclosed by the housing;
      a handle extending from the housing;
      cartridge having a distal end and a proximal end, wherein the cartridge is prefilled with a product which is a liquid or gel;
      a cartridge receiving port proximate the first end;

wherein the proximal end of said cartridge is releasably attached to said cartridge receiving port along the longitudinal axis of the housing;

an outlet formed at said second end of said housing; and, a trigger assembly housed in said handle and operatively attached to said pump;

wherein said trigger assembly moves said pump toward the cartridge receiving port; further comprising a movable piston proximate said distal end of said cartridge, said movable piston arranged within a cavity within said cartridge, and a cap including an air vent fixedly attached to said distal end of said cartridge; wherein said movable piston pushes said liquid or gel product within said cartridge toward said cartridge receiving port when said liquid or gel product is pumped from said cartridge the method comprising releasably attaching a cartridge onto the applicator;

pointing the outlet of the applicator toward the target;

pulling the trigger of the applicator; and, pumping the product through the outlet of the applicator onto the target.

19. The method of applying the product according to claim 18, wherein said applicator further comprises an LED light and said method further comprises aiming said LED light at said target.

20. The method of claim 18, wherein the product is selected from the group consisting of insecticide, pesticide, fungicide, herbicide, and a combination thereof.

21. An applicator comprising a housing having a first end and a second end;

a pump enclosed by said housing;

a handle extending from said housing;

a cartridge receiving port proximate said first end of said housing; wherein the cartridge comprises a product in the form of a liquid or gel;

an outlet formed at said second end of said housing; and, a trigger assembly housed in said handle and operatively attached to said pump, wherein said trigger assembly moves said pump toward said cartridge receiving port, wherein said pump is returned by a first spring, wherein said trigger assembly is returned by a second spring, wherein the first and the second springs are different springs further comprising a movable piston proximate said distal end of said cartridge, said movable piston arranged within a cavity within said cartridge, and a cap including an air vent fixedly attached to said distal end of said cartridge; wherein said movable piston pushes said liquid or gel product within said cartridge toward said cartridge receiving port when said liquid or gel product is pumped from said cartridge.

* * * * *